Patented Aug. 16, 1938

2,127,470

UNITED STATES PATENT OFFICE 2,127,470

PRODUCTION OF METALLO POLYAZO DYES

Werner Lange, Dessau-Ziebigk in Anhalt, Germany, assignor to General Aniline Works, Inc., New York, N. Y., a corporation of Delaware No Drawing. Application November 14, 1935, Serial No. 49,735. In Germany December 21, 1934

7 Claims. (Cl. 260—148)

The present invention relates to a process for manufacturing new polyazo dyes and to the new products obtainable by this process.

This invention is based on the observation that dyes made by coupling 1,2-dihydroxy- or 1,2,3- or 1,2,4-trihydroxy benzene with 2 or 3 mols of diazo- or diazoazo compounds, of which at least one contains a nitro group, are particularly suitable for dyeing leather. The dyeings produced are characterized by fine yellow-brown, Havana-brown to olive-brown tints and the dyeings are well equalized and of good properties of fastness. The latter, particularly fastness to light, may in most cases be improved by treatment of the dyes with a metal compound forming a metal complex with the dyes, a very small proportion of the salt being generally sufficient.

Preferably such heavy metal compounds are used which besides their capacity to form metal complex compounds with the dye, have an oxidizing action. Such compounds are, for instance, the salts of bivalent copper, alkali metal chromates or alkali metal permanganates. In the case of heavy metal compounds without oxidizing effect, such as the salts of trivalent chromium, an oxidizing agent, such as air, may be employed together with the salt.

From known dyes having a similar constitution, but having resorcin as a middle component, the dyes prepared according to the present invention are differentiated by an essential shift of the tints to the yellow side of the spectrum. When using resorcin in building up disazo dyes, generally more or less reddish brown dyeings are obtainable, the trisazo dyes being even more reddish or dark brown according to the election of the diazo components; this holds true as well for the coppered as the uncoppered dyes. In contradistinction thereto, the new dyes dye either coppered or uncoppered on leather especially valuable Havana brown tints which may be varied by a specific election of the component to olive-brown which, however, never become reddish.

The following examples illustrate the invention, the parts being by weight:—

*Example 1.*—21.8 parts of 1-amino-4-nitrobenzene-2-sulfonic acid are diazotized in the usual manner and coupled in ice-cold solution, alkaline with sodium carbonate, with 12.6 parts of 1,2,3-trihydroxybenzene. When coupling is complete there is run into the ice-cold liquor, still alkaline with sodium carbonate, a diazo solution prepared from 15.3 parts of 1,3-diamino-4-nitrobenzene. The dye is salted out in the usual manner. It dyes chrome leather or vegetable tanned leather Havana brown tints. For the after-treatment with copper salt one uses with advantage the dye solution before salting out; thus there may be added to the hot solution, in presence of an excess of sodium carbonate, an aqueous solution of 50 parts of copper sulfate or a solution of 50 parts of crystallized copper sulfate which has been supersaturated with ammonia. After a short time the dye is then salted out as usual. It dyes chrome leather or vegetable-tanned leather markedly more yellow than the untreated dye does. The dyeings are also of improved fastness to alkali and of an essentially increased fastness to light.

*Example 2.*—The first coupling operation is conducted as described in Example 1 and then there is run in, in the cold, a diazo solution made from 30.9 parts of 4'-nitro-4-amino-diphenylamine-2'-sulfonic acid, simultaneously with a solution of so much caustic soda lye that during the reaction the liquor remains alkaline. When coupling is complete, the dye is salted out in the usual manner. It dyes chrome leather and vegetable tanned leather Havana brown. The dyeings on leather are thoroughly fast to alkali and light. By treating the dye with a copper salt solution as described in Example 1, the fastness to light of the dyeings on leather is improved.

*Example 3.*—30.9 parts of 4'-nitro-4-amino-diphenylamine-2'-sulfonic acid are diazotized in the known manner and coupled with a solution of 12.6 parts of 1,2,3-trihydroxybenzene in the cold and in the presence of an excess of sodium carbonate. When coupling is complete, there is run into the cold solution a diazo solution made from 15.3 parts of 1,3-diamino-4-nitrobenzene, together with sufficient caustic soda lye to retain the solution alkaline. The dye is salted out: it dyes chrome leather and vegetable tanned leather Havana brown. By treatment with a copper salt, as described in Example 1, the properties of fastness, particularly that to light, are essentially improved.

If, instead of 30.9 parts of 4'-nitro-4-amino-diphenylamine-2'-sulfonic acid, 29.4 parts of 4'-methoxy-4-aminodiphenylamine-2'-sulfonic acid are used and the operation is otherwise as described above, there is obtained a dye which dyes chrome-leather and vegetable-tanned leather olive-brown tints. The properties of fastness of this dye also are improved by after-treatment with copper salt.

*Example 4.*—27.7 parts of 4-aminoazobenzene-

4'-sulfonic acid are diazotized in known manner and coupled, in presence of an excess of sodium carbonate, in the cold with a solution of 12.6 parts of 1,2,3-trihydroxybenzene. When coupling is complete, there is run in, in the cold, a diazo solution made from 15.3 parts of 1,3-diamino-4-nitrobenzene together with so much caustic soda lye that the reaction remains alkaline. The dye is salted out in the usual manner and dyes chrome leather and vegetable tanned leather Havana brown.

For after-treatment with copper salt the dye solution may be used without preliminary salting out. In presence of an excess of sodium carbonate or in presence of ammonia a solution of 5 parts of crystallized copper sulfate may be run into the hot solution and the dye then salted out in the usual manner. By this after-treatment the fastness to alkali, and particularly fastness to light, are improved.

Example 5.—27.7 parts of 4-aminoazobenzene-4'-sulfonic acid are diazotized and coupled with 12.6 parts of 1,2,3-trihydroxybenzene as indicated in Example 4. Then the diazo compound prepared from 21.8 parts of 4-nitro-1-aminobenzene-2-sulfonic acid is added in the cold and in the presence of sodium carbonate in excess. The shade of the dye by this coupling is varied from red-brown to yellow-brown. The disazo dye is easily soluble in water, so that it cannot be separated from the alkaline solution by addition of common salt. Then there is run in, in the cold, a diazo solution prepared from 13.8 parts of 4-nitro-1-aminobenzene, whereat the reacting solution remains alkaline. The trisazo dye, likewise, is yellow-brown and scarcely differentiated with respect to its tint from the disazo dye; it is, however, faster to the action of acids and is easily salted out from the solution. It dyes chrome leather and vegetable tanned leather yellowish Havana brown.

By an after-treatment with copper salts the shade of the dye becomes more covered and faster to the action of light.

When using in the foregoing example as a third diazo component 15.3 parts of 4-nitro-1,3-diaminobenzene instead of 13.8 parts of 4-nitro-1-aminobenzene, a very similar dye is obtained.

Example 6.—The diazo compound prepared from 15.4 parts of 4-nitro-2-amino-1-hydroxybenzene, is introduced into an ice-cold solution of 1,2,3-trihydroxybenzene containing so much sodium carbonate that during the reaction the liquor remains alkaline. When coupling is complete, the dye is dissolved by addition of caustic soda and there is run into the cold solution the diazo compound prepared from 30.9 parts of 4'-nitro-4-aminodiphenylamine-2'-sulfonic acid, serving as the second component, the solution remaining alkaline. When coupling is complete, the dye is separated by addition of sodium chloride. It dyes chrome calf leather and vegetable-tanned sheep skin yellowish Havana brown. The dyes show a good fastness.

By an after-treatment of the dyes with salts of bivalent copper salts the tints become more covered and the fastness to light is improved.

Example 7.—13.8 parts of 4-nitro-1-aminobenzene are diazotized in the usual manner. To the diazo solution are added either in solid or dissolved form 11 parts of 1,2-dihydroxybenzene, and a solution of sodium acetate is added in the cold to the solution until the free hydrochloric acid has been neutralized. When coupling is complete, the precipitated dye is separated from the liquor.

The monoazo dye is then dissolved in about 800 parts of water and 10 parts of caustic soda while slightly warming and united after cooling to about 15 to 20° C. with the diazo compound prepared from 30.9 parts of 4'-nitro-4-aminodiphenylamine-2'-sulfonic acid, while simultaneously introducing so much sodium hydroxide that the solution remains distinctly alkaline. The second coupling occurs spontaneously, whereupon the dye is separated in the usual manner by addition of salt. The new dye dyes chrome leather and vegetable-tanned leather olive Havana tints of good fastness.

When blowing air for some hours through the solution of the dye before its separation, an end-product is obtained having similar properties but yielding essentially clearer yellow tints on leather.

By treating the dye in a warm alkaline solution with a salt of bivalent copper, the shade of the dye becomes essentially greener.

Similar as the copper compound is the chromium compound of the new dye, prepared in the usual manner.

Example 8.—The diazo compound prepared from 30.9 parts of 4'-nitro-4-aminodiphenylamine-2'-sulfonic acid is run in a cold, soda alkaline solution of 11 parts of 1,2-dihydroxybenzene. The coupling occurs spontaneously. Then a solution containing 13.8 parts of diazotized 4-nitro-1-aminobenzene is added, whereat the reaction mixture likewise is held alkaline. When coupling has finished, the dye is separated in the usual manner. It dyes chrome leather and vegetable-tanned leather very similar to that described in Example 7; the shade being somewhat more covered and browner. The dye may be transformed into its heavy metal complex compounds or transformed into a dye dyeing somewhat more yellow by blowing air through the solution.

If, instead of 4-nitro-1-aminobenzene other active components such as, for instance, aminobenzene, 1-aminobenzene-2-sulfonic acid, 1-aminonaphthalene sulfonic acids, 4-aminoazobenzene-4'-sulfonic acid, are used and the operation is otherwise performed as described in Example 7, dyes of similar tints and properties are obtained.

Example 9.—30.9 parts of 4'-nitro-4-aminodiphenylamine-2'-sulfonic acid are diazotized, whereupon 11 parts of 1,2-dihydroxybenzene are added, and at 40° C. a solution of sodium acetate is run in until the mineral acid has been neutralized. After stirring for some hours, the coupling is finished and the dye is dissolved. Then a current of air is blown through the solution for about 2 to 3 days, whereby the color of the solution becomes more yellow. Then the dye is coupled in the cold and in the presence of sodium carbonate in excess with 19.9 parts of diazotized 1-hydroxy-2-amino-4,6-dinitrobenzene and the dye is finished as usual. It dyes chrome leather and vegetable tanned leather greenish Havana tints, similar to those of Examples 7 and 8. By after-treating the dyes with copper or chromium salts, the tint of the dyes is shifted towards yellow.

Very similar dyes are obtained when substituting for 1-hydroxy-2-amino-4,6-dinitrobenzene other amines such as 1-aminobenzene, 4-nitro-1-aminobenzene, 4-nitro-1-aminobenzene-2-sulfonic acid, 4'-nitro-4-aminodiphenylamine-2'-sulfonic acid.

Example 10.—The disazo dye obtainable according to Example 4 by coupling diazotized 4-aminoazobenzene-4'-sulfonic acid (27.7 parts) with 1,2,3-trihydroxybenzene (12.6 parts) and further coupling with diazotized 1,3-diamino-4-nitrobenzene (15.3 parts) is boiled for an hour under reflux with a solution of chromium formate (7.6 parts of $Cr_2O_3$). The dye is then separated by addition of sodium chloride. It dyes chrome leather and vegetable tanned leather fast brown tints, which are more covered and faster than those produced with the untreated dye.

*Example 11.*—The dye obtainable according to Example 4 is treated for an hour in the warmth with a solution of 20 parts of potassium chromate and precipitated with salt. It dyes chrome leather and vegetable tanned leather Havana brown fast tints, which are more yellowish than those produced with the chrome complex dyes described in Example 10, in the production of which the chromium formate has no simultaneous oxidizing action.

A similar effect is obtainable by the action of other oxidizing agents, for instance, by blowing air through the dye solution before or simultaneously with the treatment with a salt of trivalent chromium, or by addition of hydrogen peroxide.

A similar dye is obtainable when using potassium permanganate instead of potassium chromate.

The treatment with copper or other metal compounds may likewise be carried out in an earlier stage of the production of the dye, that is after formation of the monoazo dye or disazo dye. In this case, likewise, an oxidizing agent, such as air or hydrogen peroxide, may be added in the case that the metal salt does not act simultaneously as an oxidizer.

*Example 12.*—27.7 parts of 4-aminoazobenzene-4'-sulfonic acid are diazotized and united in the cold and in the presence of sodium carbonate in excess with a solution of 12.6 parts of 1,2,3-trihydroxybenzene. When coupling is complete, the mixture is warmed to about 60° C., 12 parts of sodium carbonate are added and a solution of 25 parts of crystalline copper sulfate is run in. The dye solution, originally orange brown, becomes yellow brown, but remains non-fast to acids (change to violet brown). A small amount of separated red cuprous oxide which is filtered off, evidences that besides binding of copper by the dye molecule, simultaneously an oxidation has occurred. The dye solution is then united in the cold in the presence of sodium carbonate with a diazo solution prepared from 15.3 parts of 4-nitro-1,3-diaminobenzene. The dye is salted out; it dyes chrome leather and vegetable tanned leather fast Havana brown, similar to the dye described in the second paragraph after Example 4.

*Example 13.*—The monoazo dye obtainable according to Example 12, is treated in the warmth with a solution of 12 parts of potassium permanganate, whereby the color of the solution becomes yellow brown. Then it is coupled in an ice-cold, soda alkaline solution with a diazo solution prepared from 15.3 parts of 4-nitro-1,3-diaminobenzene and salted out when coupling is at an end. It dyes crome leather and vegetable tanned leather fast Havana brown tints.

*Example 14.*—The monoazo dye obtainable according to Example 12, is boiled under reflux for an hour with a chromium formate solution corresponding to 7.6 parts of $Cr_2O_3$. Then sodium carbonate in excess is added and in the cold the dye is further coupled with a diazo solution prepared from 15.3 parts of 4-nitro-1,3-diaminobenzene. The dye thus obtained dyes chrome leather and vegetable tanned leather fast, brown tints.

*Example 15.*—The monoazo dye obtained according to Example 12, is treated in the warmth for an hour with a solution of 20 parts of potassium chromate, whereby the color of the solution changes from red brown to chocolate brown, the dye remaining, however, non-fast to acids. Then the dye is further coupled in the presence of caustic alkali with the diazo compound prepared from 15.3 parts of 4-nitro-1,3-diamino benzene. The end product dyes chrome leather and vegetable tanned leather Havana brown tints and shows no distinction when compared with that prepared according to Example 11.

A similar dye is obtainable when treating the dye described in Example 14 in any stage of its production with an oxidizing agent, for instance, with air, before or after a treatment with chromium formate.

In the foregoing Examples 12 to 14 the first diazo component, viz.—the 4-aminoazobenzene-4'-sulfonic acid may be substituted by one of the other nitroamines mentioned in the other examples; especially 4'-nitro-4-aminodiphenylamine-2'-sulfonic acid is preferred as such a component.

Furthermore, as pointed out in the second paragraph of this specification, 1,2,4-trihydroxybenzene may likewise be used as a middle component and in fact in the Examples 1, 2, 3, 4, 5, 6, 10, 12, 13, 14, and 15 the 1,2,3,-trihydroxybenzene may be substituted by 1,2,4-trihydroxybenzene, whereby dyes are obtainable having the same properties as those described in these examples.

In Example 8 I have indicated that a naphthylamine sulfonic acid may be used as a diazo component and I wish to state that diazo components of the naphthalene series likewise are applicable for producing the new dyes. As such diazo components I enumerate, for instance, 1,2- or 1,4-aminonaphthalene sulfonic acid, 2-aminonaphthalene-4,8-disulfonic acid, 1-aminonaphthalene-4,7-disulfonic acid or substituted amines, such as 1-amino-4-nitronaphthalene-6- or 7-sulfonic acids, 1-amino-8-hydroxynaphthalene-3,6-disulfonic acid.

Finally, other heavy metal salts may be used for the formation of the metal complex compounds; besides those mentioned in the examples, cobalt and nickel salts are likewise useful.

Since the process of manufacturing these varied dyes is identical with the processes disclosed in the examples, it does not seem to be necessary to give new examples for these features of my invention.

With respect to the improvement of the new dyes by a treatment with an oxidizing agent and a metal compound, I wish to state that the oxidizing agent, preferably air, is to be used before transforming the dyes into their metal complex compounds, and as pointed out above, this oxidation may be carried out in any stage of manufacture of the dyes. All these possibilities are within the scope of the present invention and of the claims following hereafter.

What I claim is:—

1. The process which comprises coupling in the absence of free inorganic acids an ortho-dihydroxy compound of the benzene series of the general formula

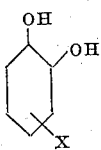

wherein X means a member of the group consisting of H and OH with at least two diazotized mono amino compounds of the group consisting of strong amino bases of the benzene and naphthalene series, from which at least one contains a nitro group and a sulfonic acid radicle, and treating the dye formed with an oxidizing metal compound forming a metal complex compound with the dye.

2. The process which comprises coupling in the absence of free organic acids an ortho-dihydroxy compound of the benzene series of the general formula

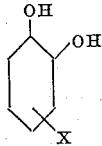

wherein X means a member of the group consisting of H and OH with at least two diazotized mono amino compounds of the group consisting of strong amino bases of the benzene and naphthalene series, from which at least one contains a nitro group and a sulfonic acid radicle, and treating the dye formed with an oxidizing agent and a metal compound forming a metal complex compound with the dye.

3. The process which comprises coupling 1,2,3-trihydroxybenzene with a diazotized nitro monoamino compound of the benzene series, treating the monoazo dye formed with an oxidizing agent, coupling it with a strong diazotized amine of the benzene series, the coupling reactions being carried out in the absence of free inorganic acids, and treating the polyazo dye formed with a metal compound forming a metal complex compound with the dye.

4. The process which comprises diazotizing 4'-nitro-4-aminodiphenylamine-2'-sulfonic acid, coupling the diazo compound with an ortho-hydroxy compound of the benzene series of the general formula

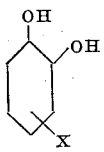

wherein X means a member of the group consisting of H and OH, further coupling the monoazo dye formed with a diazotized amine of the group consisting of strong amino bases of the benzene and naphthalene series, the coupling reactions being carried out in the absence of free inorganic acids, and treating the dye formed with an oxidizing metal compound, forming a metal complex dye with the dye molecule.

5. The process which comprises diazotizing 4'-nitro-4-aminodiphenylamine-2'-sulfonic acid, coupling the diazo compound with an ortho-hydroxy compound of the benzene series of the general formula

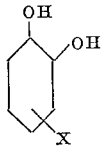

wherein X means a member of the group consisting of H and OH, further coupling the monoazo dye formed with a diazotized amine of the group consisting of strong amino bases of the benzene and naphthalene series, the coupling reactions being carried out in the absence of free inorganic acids, and treating the dye formed with a compound of bivalent copper.

6. The process which comprises diazotizing 4'-nitro-4-aminodiphenylamine-2'-sulfonic acid, coupling the diazo compound with an ortho-hydroxy compound of the benzene series of the general formula

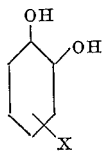

wherein X means a member of the group consisting of H and OH, further coupling the monoazo dye formed with a diazotized amine of the group consisting of strong amino bases of the benzene and naphthalene series, the coupling reactions being carried out in the absence of free inorganic acids, and treating the dye in any stage of its manufacture with air and transforming the polyazo dye in a metal complex compound.

7. The process which comprises diazotizing 4'-nitro-4-aminodiphenylamine-2'-sulfonic acid, coupling the diazo compound with an ortho-hydroxy compound of the benzene series of the general formula

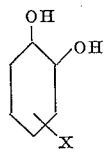

wherein X means a member of the group consisting of H and OH, further coupling the monoazo dye formed with a diazotized amine of the group consisting of strong amino bases of the benzene and naphthalene series, the coupling reactions being carried out in the absence of free inorganic acids, blowing air through the aqueous solution of the dye in any stage of its manufacture and transforming the polyazo dye in a metal complex compound.

WERNER LANGE.